Figure 1:
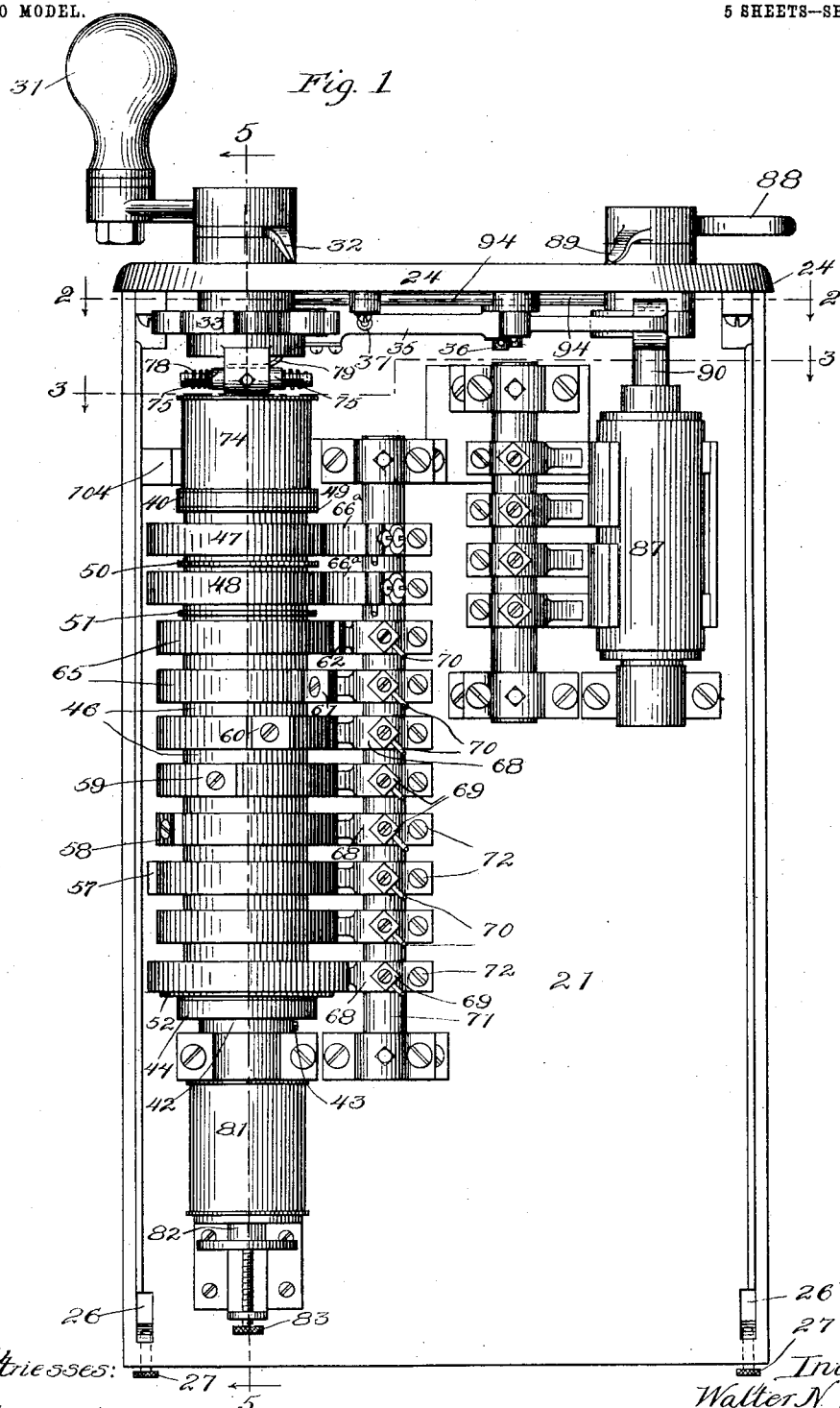

No. 742,933. PATENTED NOV. 3, 1903.
W. N. VANCE.
ELECTRIC MOTOR CONTROLLER.
APPLICATION FILED JULY 2, 1902.
NO MODEL. 5 SHEETS—SHEET 1.

Witnesses:
Wm. Geiger
A. W. Munday

Inventor
Walter N. Vance
By Munday, Evarts & Adcock
Attorneys

No. 742,933. PATENTED NOV. 3, 1903.
W. N. VANCE.
ELECTRIC MOTOR CONTROLLER.
APPLICATION FILED JULY 2, 1902.
NO MODEL. 5 SHEETS—SHEET 2.

Witnesses:
Wm Geiger
H. W. Munday

Inventor.
Walter N. Vance
By Munday, Evarts & Adcock
Attorneys

No. 742,933. PATENTED NOV. 3, 1903.
W. N. VANCE.
ELECTRIC MOTOR CONTROLLER.
APPLICATION FILED JULY 2, 1902.
NO MODEL. 5 SHEETS—SHEET 3.
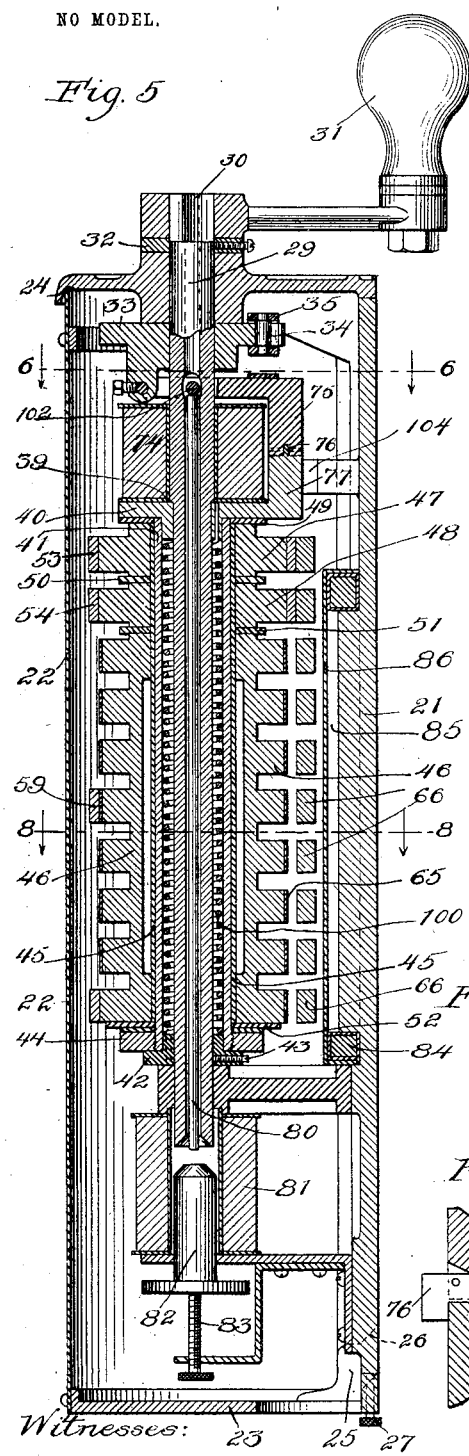
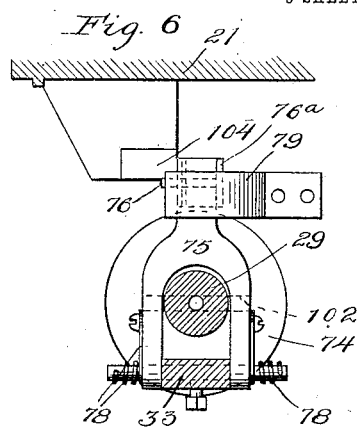
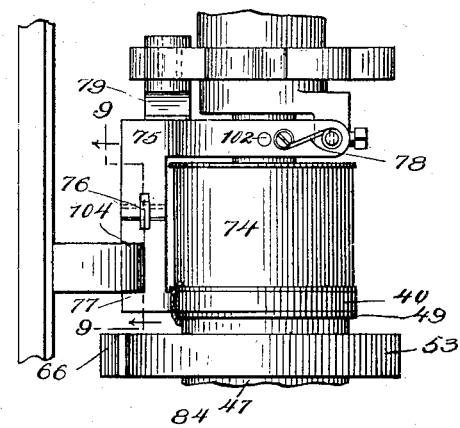
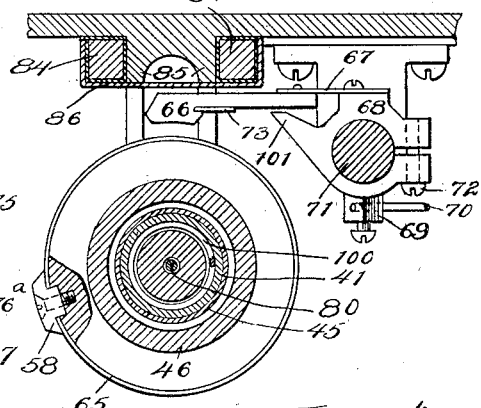
Witnesses:
Wm. Geiger
H. W. Munday
Inventor
Walter N. Vance
By Munday, Evarts & Adcock
Attorneys No. 742,933. PATENTED NOV. 3, 1903.
W. N. VANCE.
ELECTRIC MOTOR CONTROLLER.
APPLICATION FILED JULY 2, 1902.
NO MODEL. 5 SHEETS—SHEET 4.

Witnesses
Wm. Geiger
A. W. Munday

Inventor
Walter N. Vance
By Munday, Evarts & Adcock
Attorneys

No. 742,933.

Patented November 3, 1903.

UNITED STATES PATENT OFFICE.

WALTER N. VANCE, OF CHICAGO, ILLINOIS, ASSIGNOR TO THE MIEHLE PRINTING PRESS AND MANUFACTURING COMPANY, OF CHICAGO, ILLINOIS, A CORPORATION OF ILLINOIS.

ELECTRIC-MOTOR CONTROLLER.

SPECIFICATION forming part of Letters Patent No. 742,933, dated November 3, 1903.

Application filed July 2, 1902. Serial No. 114,056. (No model.)

*To all whom it may concern:*

Be it known that I, WALTER N. VANCE, a citizen of the United States, residing in Chicago, in the county of Cook and State of Illinois, have invented a new and useful Improvement in Electric-Motor Controllers, of which the following is a specification.

This invention relates to improvements upon the style of controller known as the "railway" type, in which the motion of the motor is controlled by means of a series of stationary contact-fingers and a series of movable contact-points, the latter arranged in successive positions to be brought into action by a handle, and in which also the reversing mechanism or cylinder for reversing the direction of the motor is operated by a separate or second handle.

The object of the invention is principally to provide for safety in operation, to so construct the controller that the motor cannot be reversed by it until the current is off, and so that the controlling-cylinder cannot be moved by its handle when the reversing-cylinder is in the "off" position, and so that the current cannot be applied when the shunt-field is unexcited, and so that in starting the motor any external resistance in the shunt-field circuit shall be short-circuited, and so that the current will be automatically cut off either by a failure of voltage or by a predetermined amount of overload and the controller-cylinder automatically returned to the off position by such failure or overload, and to provide an automatic brake brought into action by placing the controller-handle in the off position or in a position beyond the off position, said brake consisting of a current of electricity generated by the momentum of the motor itself or the mechanism which it drives in their continued movement after the current is cut off, whereby the motor becomes momentarily a generator, and the current which it thus generates is dissipated in resistance, retarding and stopping the movement, whereby the ordinary friction-brake devices may be wholly or partly dispensed with and the motor be made to act as its own brake; and the present invention consists in the novel parts and devices and novel combinations of parts and devices herein shown or described.

Figure 2:
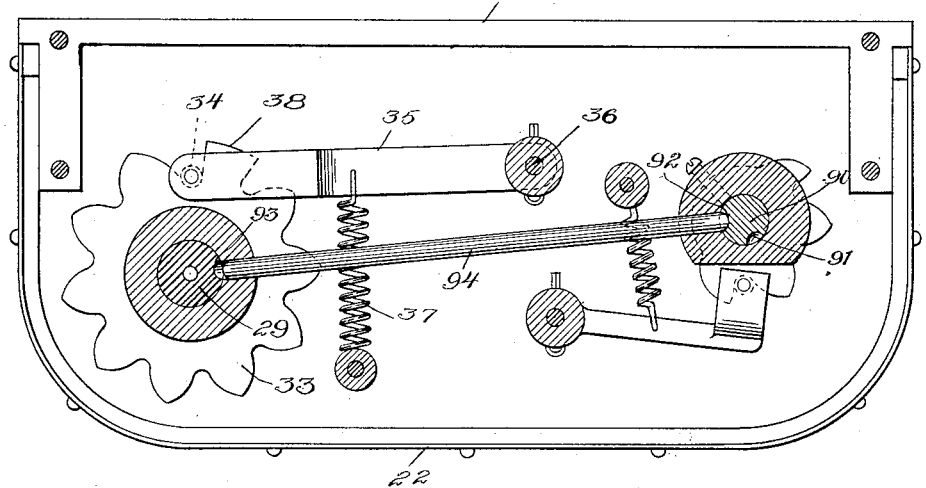
Figure 3:
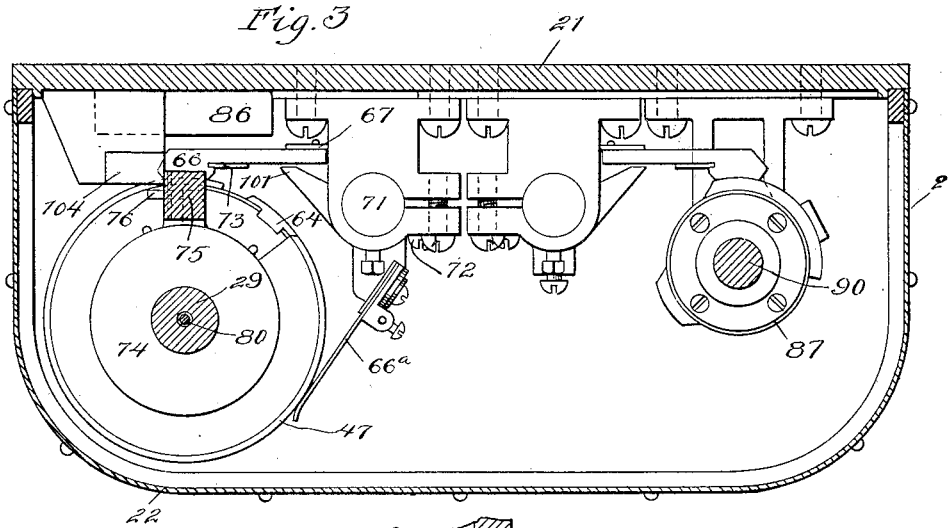
Figure 4:
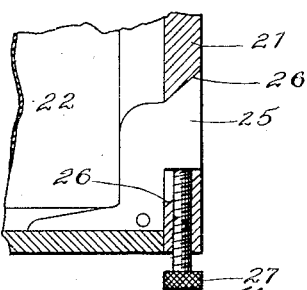
Figure 10:
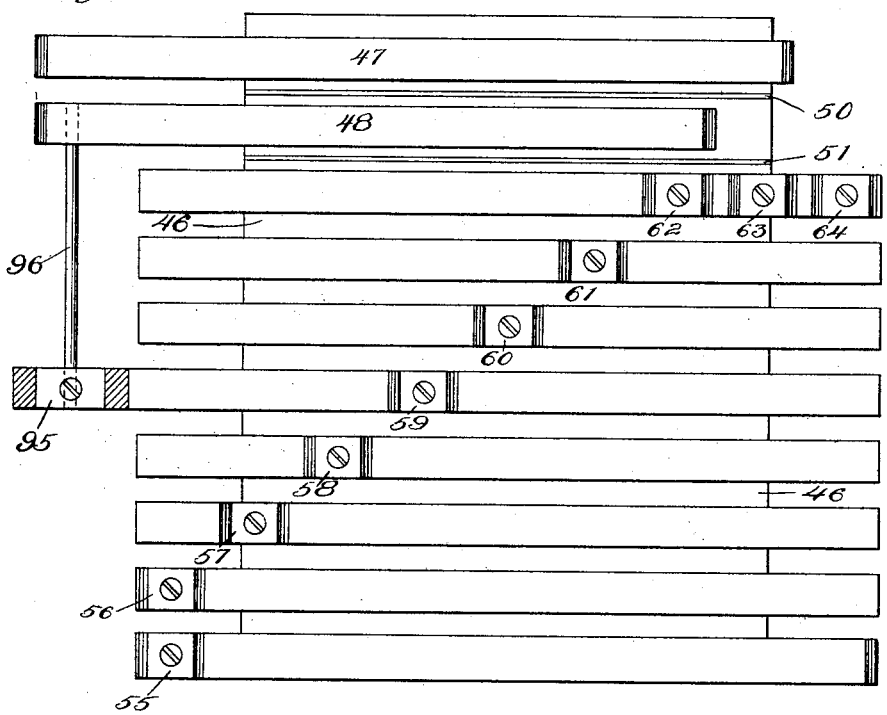
Figure 11:
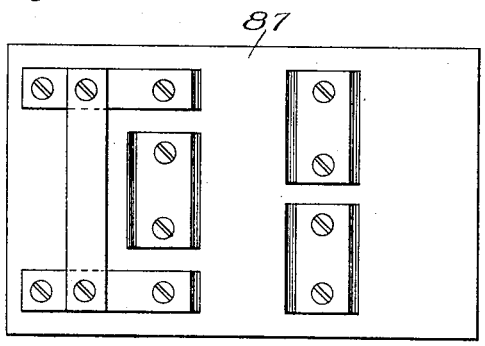
Figure 12:
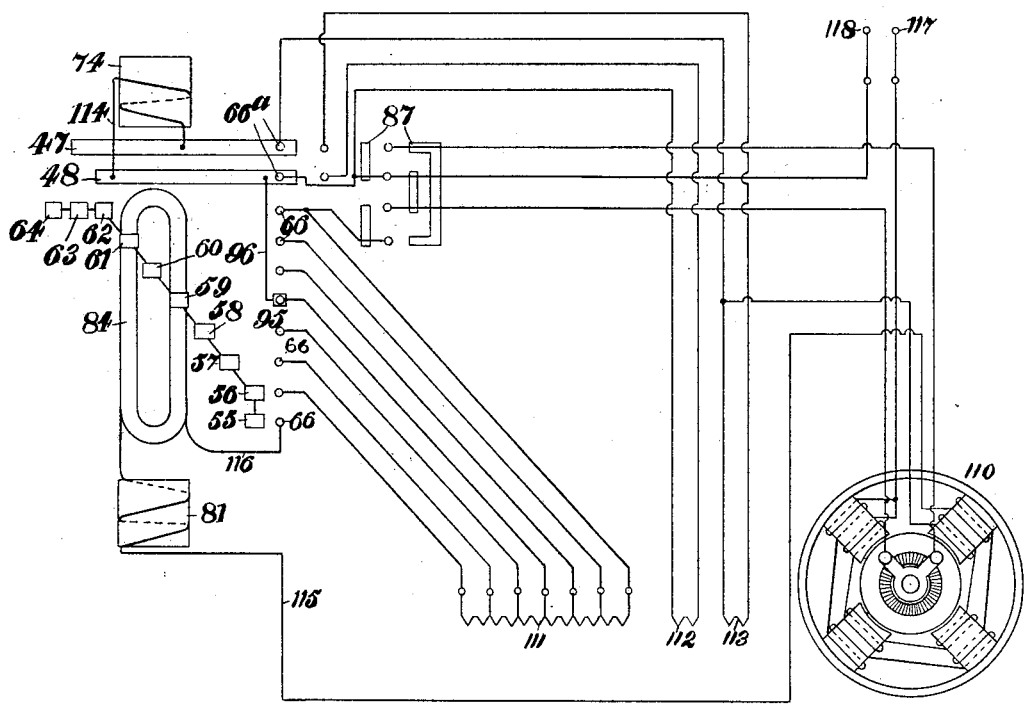

In the accompanying drawings, which form a part of this specification, Figure 1 is a front elevation of the improved controller, the casing or housing being removed. Fig. 2 is a cross-section of the controller, taken on line 2 2 of Fig. 1. Fig. 3 is a similar section taken on the line 3 3 of Fig. 1. Fig. 4 is a detail view of the method of fastening the cover to the machine. Fig. 5 is a vertical cross-section of the controller, taken on the line 5 5 of Fig. 1. Fig. 6 is a fragmentary section on the line 6 6 of Fig. 5. Fig. 7 is a detail view of the magnetically-operated latch of the no-voltage releasing device. Fig. 8 is a cross-sectional detail on the line 8 8 of Fig. 5. Fig. 9 is a vertical section on the line 9 9 of Fig. 7. Fig. 10 is a development of the surface of the controlling-cylinder, in which said surface is supposed to be unrolled or flattened out. Fig. 11 is a similar development of the reversing-cylinder, and Fig. 12 is a diagram of circuits suitable for the operation of the device.

In the accompanying drawings like characters of reference designate like parts wherever made use of in the several figures.

In said drawings, 21 represents the framework of the mechanism, which does not materially differ from that employed in the ordinary controllers of this type.

22 is a movable sheet-metal housing provided with a head 23, riveted thereto at the lower end. This housing at the upper end sets under a flange 24 on the framework and is held in position by two lugs 25 25, one at each side, which enter the slots 26 in the framework. The lugs are given a dovetail configuration, as shown, and when inserted in the slots a thumb-screw 27 for each slot is screwed up, and the lugs thus locked against withdrawal, the whole constituting a simple and secure method of uniting the casing to the framework in such manner that it may be easily applied and removed when desired.

29 is the controller-shaft, mounted to turn loosely in bearings on the framework, provided with a squared end 30 to receive the handle 31 and provided also next the handle with the index-finger 32, secured to the shaft to turn therewith. The index itself is marked on the upper head of the framework in the usual manner, being lettered to indicate the off position, as is customary in controllers of this type, and in the present invention preferably further provided with a mark to designate the braking position of the handle if the same shall not be coincident with the off position. Rigidly attached to the shaft is the star-wheel 33, the periphery of which is cut with double-inclined notches to receive a spring-held roller 34. The roller is pivoted in a forked lever 35, which is fulcrumed at 36 to the framework of the machine. Said lever 35 is held yieldingly to the wheel by the spring 37. (See Fig. 2.) The purpose of this star-wheel and its roller-pawl is to position the shaft in the operation of the handle and is the customary construction for this purpose. The star-wheel has an uncut portion 38 in its periphery, which not being provided with inclined sides operates as a positive stop to prevent the shaft being turned in either direction beyond this part. The notches in the star-wheel correspond to the points on the dial.

The cylinder, which carries the successively-arranged contact-points and which is carried by the said shaft 29, is constructed as follows: On the upper portion of the shaft is a shoulder 39, below which is the flanged collar or cylinder-head 40, fitted to turn on the shaft. Fastened to this collar at the cylindrical part of the collar is the tube 41, which extends entirely through the cylinder and is supported at its other or lower end on a second flanged collar 42, which surrounds the shaft and is adjustably secured thereto by a set-screw 43, tapped through the collar and setting against the shaft. In the space between the tube 41 and the shaft is placed a long coiled spring 100, one end of which is secured to the collar 42 and the other end to the collar 40, the construction being such that the torsional stress of the spring may be adjusted by turning the collar 42 until the required amount is reached and then fixed at that amount by fastening said collar by means of the set-screw 43. The direction of winding of the coiled spring is such that it tends to throw the collar 40 and whatever it carries over with a circular motion in the direction from left to right, as the hands of a clock move in the upper arc of its dial. The lower end of the tube 41 is screw-threaded and provided with a follower-nut 44. Around the outside of the tube is a layer of insulating material 45, and outside of this is the cast-iron part 46 of the cylinder and also the portions 47 and 48. All these parts 46, 47, and 48 are thus united to the tube 41 in such manner as to be electrically insulated therefrom, but to move therewith as a solid whole. The parts 47 and 48 are insulated from each other and also from the other parts by the insulating-washers 49 50 51, and the cast-iron part 46 is also insulated from the following nut by the insulating-washer 52. The rings 47 and 48, as shown, are provided with exterior brass bands 53 54, which it may be desirable to renew when worn; but, if preferred, said rings may be made in one solid piece. The cast-iron body part 46 is cut into a number of parts by deep grooves. The purpose of the grooves is to permit the placing of asbestos or other refractory insulation between the adjacent contact points and fingers to prevent arcs from being formed across.

On the surface of the cast-iron body part 46 are mounted the contacts for controlling the armature-circuit in whatever arrangement of them may be desired, one arrangement being shown in the development at Fig. 10. These contact-points are on the drawings marked in succession 55 56 57 58 59 60 61 62 63 64. Each contact-point is connected electrically to the metal ring which supports it. The surface of said metal rings adjacent to said contact-points, and preferably all the way around, are covered with a band of varnished asbestos or other insulating material 65 as a guard against the maintenance of any arc which may be formed upon breaking contact between said contact-points and the spring contact-fingers, which latter are now to be described. The spring contact-fingers may be of any ordinary construction, insulated from each other and from the framework of the machine; but I prefer to make them of a special form shown in the drawings, in which 66 is the contact-finger, supported by the spring 67 from the split collar 68, which carries the binding-post 69, in which the circuit-wire 70 is secured, and the stop 101, the latter to limit the motion of the fingers 66 when not on the contact-point. This apparatus as a whole is secured to the rod 71 of insulating material by being slipped over the end of said rod, and the screw 72, being tightened, binds the split collar securely to the rod in any desired position, and so that the spring-finger may be adjusted laterally in proper position or turned more or less to give greater or lesser pressure of contact. To the contact-finger 66 and adjacent to the contact-surface thereof is secured an insulating-pad 73, preferably of varnished asbestos and which is intended to serve as an arc-guard.

Between the collar 40 and star-wheel 3 is the magnet 74, which is secured mechanically to the collar 40 and moves therewith, and by means of said rings and the contact-fingers bearing thereon the magnet is energized at all times when the motor is operatively connected to the circuit. In the construction shown this is accomplished by connecting the fingers 66 and the magnet which is connected between their respective rings in series with the shunt-field, which is energized at all times when the motor is operatively connected to the circuit. By arranging a gap in the periphery of these rings to break contact with the fingers 66 successively, the connection being maintained in each case by the subsidiary fingers 66ᵃ through a certain amount of resistance connected between 66 and 66ᵃ, these two rings 47 and 48 afford two speed changes beyond the normal in addition to their function of carrying current to the magnet 74.

If, as is sometimes the case, it is preferable to connect the magnet 74 directly across the line, this can of course be done by winding the magnet to a sufficiently high resistance and making the proper connection. 75 is the armature of the magnet 74, said armature being pivoted to a part or collar 33, connected to and moving with the shaft 29, and springs 78 are arranged so as to normally uphold or swing upward the armature 75. To the free end of this armature is fixed a pivoted latch 76, which when the armature is down, as by the magnet 74 being energized, engages a projection 77 on the collar 40, which collar, it will be remembered, is loose on the shaft 29, but rigidly connected to the controller-cylinder. By this arrangement and construction of parts it will be seen that when the handle 31 is turned in such direction as to apply current to the motor or to accelerate the speed in the motor the armature 75 by means of the latch 76 will engage with the projection 77 on the controller-cylinder and cause said controller-cylinder to be moved with the shaft, provided the magnet is then energized, and the armature-latch thereby held in engagement.

The object of pivoting the armature 75 and latch 76 is so that when the magnet 75 is deënergized the armature will rise, and latch 76 will offer no resistance to the instant return movement of the part 77 under the influence of the coiled spring. The latch 76 being pivoted, it will be seen that as soon as the armature 75 is deënergized the part 77, being no longer held by anything, will begin to move or rotate under the influence of the coil-spring 100, for the latch 76 is free to swing away on its pivot, and consequently said latch will offer absolutely no obstruction to the movement of the part 77 except when the armature 75 is held close down and under the full influence of the magnet, at which time the latch cannot swing, because its tail-piece in an effort to swing will then come into contact with the upper surface of the part 77. The latch itself should of course be made of some non-magnetic metal, as brass. The magnet 74 being energized, the cylinder moves with the shaft, being driven in the one direction by the engaged latch 76 and in the other by the torque of the spring, or, in the case of failure of that, by the permanent projection 76ᵃ on the armature, which always extends far enough to engage the projection 77, and thus drive the cylinder; but if from any cause the magnet 74 is deënergized, the latch no longer restraining or driving the cylinder, the spring will force it to return instantly to the initial or off position, independent of the position or state of motion of the handle. A cushioned buffer 104 is provided to limit the motion and receive the blow of the projection 77 on the cylinder.

To start the motor, it is now necessary to bring the handle back to the initial or off position, where the latch 76 on armature 75 may engage the pole projection 77. To prevent adhesion of the armature to the part 77, which it will be understood constitutes the pole-piece of the magnet, it is preferable that there should be, as shown in the drawings, a slight air-gap left between the armature and the said pole-piece when the armature is fully down, and this may be effected by any desired form or stop to limit the movement of the armature in this direction, and it will be seen also that as this engagement of the latch with the projection depends upon the existence of the circuit through the magnet the handle cannot be connected to the controller-cylinder in such manner as to again move it until current to the motor is reëstablished. The magnet 74 is of course not strong enough to attract the armature through any great distance and is, in fact, not strong enough to attract said armature into contact with the projection. Hence I provide the cam-shaped spring 79, against which the armature strikes when the handle approaches the off position and which forces the armature down until the latch engages with the projection, after which when the magnet is again energized it will be held down by the magnet.

The foregoing constitutes an automatic safety appliance which always insures the controller-cylinder being returned automatically to the off position whenever the current to the motor ceases, independently of the position of the controller-handle. Consequently the operator may always know that the motor cannot start up except when the handle has been moved, and this will prevent many accidents which are liable to occur in the absence of such safety appliance. Moreover, the existence of this device in the controller obviously makes it possible to put the controller in the off position by a mere push-button or switch in any part or place in a proper circuit-wire that may be carried to all parts of the machine or machinery to always be in reach of the workman in case of emergency or which may be operated automatically, if desired. This may be done either directly by such a push-button or indirectly by means of a relay and auxiliary battery-circuit. It is also desirable in a machine of this character that when an excessive overload occurs from any cause—such, for example, as an obstruction to the movement of the machinery or from the operator attempting too rapid an acceleration in starting—that current should quickly be cut off from the armature, and it is especially desirable that this should be done by restoring the controller to the off position rather than by merely breaking the circuit at an auxiliary contact, and this I accomplish as follows: The shaft 29 is made hollow and a rod 80 passed up through it to slide freely. When this rod is pushed upward with sufficient force, it will strike against a pin 102 on the armature 75 and release the latch by physically overcoming the attraction of the magnet, and this will of course permit the coiled spring to throw the controller-cylinder into the off position, just the same as the deënergization of the magnet 74 would do. To move this rod at the proper time, I provide a magnet 81, which is in the form of a solenoid, the armature of which is in position to strike the bottom of the rod 80 when the solenoid is excessively energized by a current sufficient to lift the armature 82 from the position in which it stands adjusted. The rod 80, while free to slide in the shaft, is frictionally held therein, preferably by giving the rod a slight bend, so that it is self-supporting and does not come in contact with the armature of the solenoid until said armature is lifted by the action of the magnet, the object being to cause the armature of the solenoid to strike the rod a blow, which is imparted at the upper end of the rod to the latch-armature of the magnet 74, such a blow being sufficient to detach the armature 75 against the magnetic influence which holds it down. The solenoid 81 being connected in series with the armature-current of the motor carries at all times the current of the armature, and the armature of the solenoid is so adjusted as to position that the normal armature-current of the motor will not energize the solenoid sufficiently to cause it to lift the solenoid-armature 82; but when a predetermined excess of current passes through the solenoid on account of the excessive overload to be guarded against then the solenoid will instantly lift its armature 82 and cut off the controller, and thus stop the motor. The adjustment of the position of the solenoid-armature 82 is effected by means of the adjusting-screw 83, against which the solenoid-armature 82 rests by its own weight. When this screw is turned upward, the solenoid will respond to a lesser excess of current, and when the screw is turned downward it will not respond until a greater excess of current exists.

Between the spring-fingers 66 and the metal framework of the machine is arranged the blow-out magnet 84, the pole-piece of which is formed, preferably, of a projection from the iron framework of the controller. The pole-piece is formed with two ridges 85, which by reference to Fig. 8 it will be seen are located so as to concentrate the lines of force of this magnet at each end of the contact portion of the spring contact-fingers 66. A covering of varnished asbestos 86 over this magnet serves as an arc-guard. It will be seen that the lines of force from the pole projections 85 are directly across the path of any arc which may be formed when the contact-fingers 66 leave the contact-points on the cylinder. The magnet 84 is an electromagnet and is connected in the armature-circuit of the motor, so that it is energized by the same current that forms the arc to be extinguished at all times when the motor is running. It has been found that such a blow-out magnet will not successfully eliminate the arc unless it be very strongly excited, and hence it takes a very considerable amount of energy to effect the object; but I have found that the presence of the magnets 74 and 81 when properly connected as to the direction of the current through them may be made to aid the blow-out magnet very materially, and thus lessen the amount of energy consumed thereby. To accomplish this purpose, the magnets 74 and 81 should be wound or connected to the current in such manner as to present similar poles to each other which are opposite to the pole presented by the blow-out magnet 84. This gives a direction to the lines of force of said magnets 74 and 81 such that they coact with the lines of force of the magnet 84 and materially increase its effectiveness in blowing out or extinguishing the arc, so that the controller thus arranged is found to be practically arcless.

Parallel to the controller-cylinder is the usual reversing-cylinder 87, which is or may be constructed in all respects as is customary in controllers of the railway type. It is provided with the customary handle 88 and index-finger 89 and has any usual form of spring-detent for holding it in position. The novel feature in respect to this device consists in the mechanism for interlocking the reversing-cylinder and the controlling-cylinder to prevent the operator from reversing the current while the controller is in the "on" position and also to prevent the movement of the controller-handle while the reverser-handle is in the off position. This I accomplish as follows: In the shaft 90 of the reversing-cylinder two rounded or beveled sockets 91 92 are cut, (see Fig. 3,) and in the shaft 29 a similar single socket 93 is cut. A rod 94, with rounded ends, is provided and extends from the controller-shaft to the reversing-shaft and is made just long enough, so that when entered fully, say, in the socket 92, it will just clear the socket 93 and when fully entered in the socket 91 it will also just clear said socket 93 or when fully entered in the socket 93 it will just clear the sockets 91 and 92. This rod is supported in perforations which pass through the stationary bearings of the two shafts, and is consequently free to slide endwise, but cannot be moved sidewise. Now supposing the affairs to be in the position shown in Fig. 2 and the end of the rod fully inserted in the socket 92, it will be seen that the shaft 29 can be moved freely; but if turned at all the socket 93 will be moved away from the end of the rod and the solid surface of the shaft presented thereto, so that the rod is no longer free to slide endwise, and while in this connection it will be impossible to move the shaft 91 of the reversing-cylinder; but if the shaft 29 is in the position shown in Fig. 2 and the socket 93 opposite to the end of the rod, which position, it should be stated, is the off position of the controller, then the reversing-shaft can be rotated, because an effort to rotate it will simply force the rod out by the cam action of the socket 92 and the rod will be free to slide into the socket 93 on the controller-shaft; but when this takes place the controller-shaft is thereby locked. Thus it will be seen that the movement of either shaft locks the other and also that while one is locked the other is free to move. The socket 92 corresponds to the "ahead" position and socket 91 to the "back" or reverse position of the reversing-cylinder, and when either one of these sockets is opposite to the end of the rod 94 the controller-shaft is free to move; but it cannot be moved except when the controller-shaft is in this off position. This mechanism while absolutely certain in action is entirely free from springs and levers, and is therefore exceedingly durable and cannot get out of order.

The automatic self-acting brake is constituted as follows: Upon any one of the rings of the controller-cylinder except the lowermost one or the two uppermost ones—that is to say, upon any one of the rings which are employed to introduce armature resistance—I affix an extra contact-point 95 and locate it so that it will come in contact with the spring-finger corresponding to that ring only when the controller-cylinder is in the off position. This extra contact-point 95 is insulated from the ring which carries it, and from it an electrical connection 96 is led to the ring 48, which by its spring-finger is connected at all times while the motor is running to one side or other (according to the direction the motor is running) of the armature-circuit, and as all of the spring-fingers below the ring 48 are connected to the opposite side of the armature-circuit the result is that when the controller-cylinder is in the off position and any one of these spring-fingers rests upon the extra contact-point 95 the armature-circuit is complete in itself, but cut off from the line or its supply of electricity. Consequently if the motor continues to run of its own momentum alone, or of its own momentum, assisted by the momentum of whatever machinery or moving parts it is mechanically connected to this further movement will cause the motor to act as a separately-excited generator and generate in said armature-circuit a current of electricity which will be dissipated in the form of heat in whatever resistance said circuit includes, and as this extra contact-point 95 may be placed upon any one of the rings of the controller specified it is obvious that the amount of resistance in this braking-circuit may be predetermined to suit any requirement. This changing of the motor into a temporary separately-excited generator will always take place when the controller is put in the off position, and consequently the act of throwing the controller-handle into the off position will thus automatically apply the brake, and the braking action will, moreover, always be in proportion to the speed of the motor when the brake is applied and the action of braking will always be a uniform retardation, and as the braking action depends entirely upon the dynamic action of the momentum of the motor and other moving parts the mere placing of the controller-handle in the off position when the motor and machinery are at rest will not operate to set or fix or put into operation any brake which requires to be released before the machinery can be set in motion. It sometimes happens, of course, that when the machinery is at rest and the controller-cylinder necessarily in the off position it is desirable to turn the machinery by hand or otherwise for some purpose of examination or repair, for example, and in such case the turning of the machinery or motor by hand or very slowly will tend to generate the braking-current; but I find that such slow motion will generate so slight a current and produce so slight a braking action as not to interfere practically with this slow sort of turning; but if it shall ever be found to interfere by reason of the size of the motor or by the way in which the motor is geared this can be remedied by simply putting the handle of the reversing-cylinder in the off position, which will operate to entirely disconnect the armature.

In the diagram shown at Fig. 12, 110 represents the motor—in this case a motor of the compound type. 111 is a series of resistance-coils, the terminals of which are brought to the contact-fingers of the cylinder. These resistance-coils are adapted to be introduced in the armature-circuit of the motor. 112 and 113 are other resistance-coils. These are adapted to be inserted in the shunt field-circuit of the motor, and their terminals are brought to the fingers, which bear on the rings 47 and 48 of the cylinders. 114 is the circuit through the no-voltage magnet 74, connected from the ring 47 to the ring 48. 115 is the circuit through the overload-magnet 81, one of its terminals being connected to the armature of the motor and the other to the blow-out magnet 84, the circuits around said blow-out magnets being shown at 116, one terminal being connected as above described and the other terminal to the bottom of the ring of the controller-cylinder and passing through whatever of the resistance 111 may be in circuit and the armature of the motor. 117 and 118 are the two binding-posts for connecting the circuit system herein shown to the circuit of the dynamo, said dynamo or source of electric energy not being shown on the diagram.

I claim—

1. The combination of the controller-cylinder provided with its successively-arranged contacts, the blow-out magnet placed adjacent to said contacts, and the two latch-operating magnets placed at each end of the controller-cylinder, all three of said magnets being so wound and connected that their lines of force coöperate to extinguish the arc or arcs formed at the contacts, substantially as specified.

2. The combination with the controller-shaft and reverser-shaft, of the locking device consisting of a rod sliding in supports between the two shafts and cam-shaped cavities in the two shafts, said rod having itself cam-shaped ends, substantially as specified.

3. In a controller device operated by a handle, the combination of the movable part which carries the contacts, an electromagnet connected to said part, and an armature connected to said handle, said armature having a catch adapted to engage the movable part while the electromagnet is energized and to release it when deënergized; with means operating to return the contacts to the initial or off position independently of the handle when the armature is deënergized, substantially as described.

4. In a controller device, the combination of a shaft operated by a handle, a rotatable part carrying the contacts, and a latch connected to said shaft and adapted to lock said shaft to said part, an electromagnet connected to the contact-carrying part and adapted to hold said latch in locked position while energized and to release it when deënergized, and means operating to return the contact-carrying part to its initial or "off" position when said latch is released, substantially as described.

5. In a controller, the combination of a shaft operated by a handle, a movable part carrying a series of contacts, an electromagnet having its coils mounted on said movable part and its armature connected to the shaft, a latch connected to said armature adapted to lock said part to said shaft, and means for returning the contacts to the initial or off position when said latch is released, said armature holding the latch in engagement while said magnet is energized, and releasing said latch when the magnet is deënergized, substantially as described.

6. In a controller having one part operated by a handle, and another movable part carrying contacts, the combination of a latch connecting said parts, and a spring, operating to return the contact-carrying part to the initial or off position when said latch is released; with an electromagnet having its coils connected to one part and its armature connected to the other part, said armature holding the latch in engagement while the magnet is energized and releasing said latch when the magnet is deënergized, substantially as specified.

7. In a controller, the combination of a part operated by a handle, and a part carrying the movable contacts, and an electromagnet having its coil fast to one part and its armature fast to the other part; with a latch pivoted to said armature and adapted to connect said parts when the magnet is energized, and a spring operating to return the movable contacts to the initial or off position independently of the handle when said latch is released, substantially as described.

8. In a controller, the combination of a movable part carrying contacts, a shaft operated by a handle, and a latch adapted to lock the shaft and part so that the movement of the handle in one direction may move said movable part; with an electromagnet having its coils connected to the said part, and its armature connected to the shaft, said armature controlling said latch, substantially as described.

9. In a controller, the combination of the movable handle, a movable part which bears the contacts, a coiled spring connecting said handle and part under tension, and a latch connecting said part with the handle, said spring operating to return the contacts to the initial or off position when said latch is released; with means for releasing the latch, comprising an electromagnet, and its armature and connections whereby the said armature disengages the latch when the electromagnet is energized, said magnet being adjusted to act upon passage of an excessive current, substantially as described.

10. In a controller, the combination of a rotatable shaft, a movable part bearing the contacts, a latch connecting said part with said shaft, and means adapted to return the movable contacts to the initial or off position when said latch is released, and two electromagnets for releasing the latch, one magnet having its coils connected to the movable part, and its armature connected to the shaft, said armature operating to release said latch when the coils are deënergized from a failure of the common source of current; and the other magnet operating to release said latch when excessively energized by a high current, whereby the contacts will be automatically returned to the initial or off position, either when the current from the common source fails, on the one hand, or there is an excessive overload on the other, substantially as specified.

11. The combination of the controller-cylinder provided with its successively-arranged contacts, the blow-out magnet placed adjacent to said contacts, and a latch-operating magnet placed at one end of the controller-cylinder, both said magnets being so wound and connected that their lines of force coöperate to extinguish the arc or arcs formed at the contacts, substantially as specified.

12. The combination with the controller-shaft and reverser-shaft, of a locking device consisting of a rod sliding between the two shafts and adapted to engage cams on either of the shafts to lock one when the other is shifted, substantially as specified.

13. In a controller, the combination of a rotatable shaft, a series of contacts rotatably mounted thereon, and a series of fixed contacts adapted to engage with the rotatable contacts when the latter are turned in one direction; a catch adapted to lock the shaft to the rotatable contacts, and means for normally keeping the latch out of engagement; with an electromagnet having one member fast to the contacts and its other member fast to the shaft, and arranged to hold the catch in engagement when energized, said magnet being in electrical connection with the main circuit, and means for automatically returning the movable contacts to "off" position when the magnet is deënergized and the latch thereby released, substantially as described.

14. In a controller, a rotatable series of contacts, a rotatable shaft having an operating-handle, a spring connected to the shaft and contacts, and adapted to rotate the latter relatively to the former, and a catch adapted to lock the shaft to the contacts; with an electromagnet and the trip-rod actuated thereby and adapted to unlock the catch, when the magnet is energized by an excessive current, thereby permitting the spring to return the contacts to "off" position, substantially as described.

15. In a controller, the combination of a rotatable shaft, a series of contacts rotatably mounted thereon, and a series of fixed contacts adapted to engage with the rotatable contacts when the latter are turned in one direction, a catch at one end of the series of contacts adapted to lock the shaft to the rotatable contacts, and means for normally keeping the latch out of engagement; with an electromagnet adjacent to the catch and adapted when energized to hold the catch in engagement, and a second electromagnet at the other end of the contacts and a trip-rod actuated by said second magnet adapted to engage and release the catch when such magnet is energized by an excessive current, and means for automatically returning the movable contacts to "off" position whenever latch is released, substantially as described.

16. In a controller, the combination of the shaft and handle, the cylinder rotatably mounted on said shaft carrying the movable contacts, and a helical spring surrounding the shaft within the cylinder and connected thereto so as to rotate the cylinder on the shaft; with a latch for locking the shaft to the cylinder, and an electromagnet having one part fast to the cylinder and another part fast to the shaft, said magnet controlling said latch and holding the same in engagement when energized, and a second electromagnet and devices actuated thereby adapted to release said latch when said second magnet is energized by an excessive current, substantially as described.

17. In a controller, the combination of a rotatable hollow shaft, a cylinder rotatably mounted on the shaft and carrying the movable contacts, a spring connecting the cylinder and shaft and adapted to turn the former on the latter, a latch for locking the shaft to the cylinder, a rod within the hollow shaft adapted to release the catch, and an electromagnet adapted to actuate said rod, substantially as described.

18. In a controller, the combination of a rotatable hollow shaft, a cylinder rotatably mounted on the shaft and carrying the movable contacts, a spring connecting the cylinder and shaft and adapted to turn the former on the latter, a latch for locking the shaft to the cylinder, a rod within the hollow shaft adapted to release the catch, and an electromagnet adapted to actuate said rod when energized by an excessive current, and a second electromagnet adapted to hold the latch in engagement when energized, and means for releasing the catch when the second magnet is deënergized, substantially as described.

19. In combination, the controller-cylinder provided with successive contacts, a blow-out magnet adjacent to said contacts, the latch-operating magnet, and the overload-magnet adjacent to said cylinder, said latch and overload-magnets being arranged and adapted to assist the blow-out magnet in preventing and extinguishing arcs, substantially as set forth.

WALTER N. VANCE.

Witnesses:
H. M. MUNDAY,
L. LINDAUER.